United States Patent [19]

Heule

[11] Patent Number: 4,660,262
[45] Date of Patent: Apr. 28, 1987

[54] FORWARD AND REVERSE MILLING CUTTER

[76] Inventor: Heinrich Heule, Kristallstrasse 6, Au, Switzerland, 9434

[21] Appl. No.: 617,962

[22] Filed: Jun. 7, 1984

[30] Foreign Application Priority Data

Jun. 10, 1983 [DE] Fed. Rep. of Germany ....... 3321111

[51] Int. Cl.$^4$ ............................................. B23B 11/00
[52] U.S. Cl. ......................................... 29/57; 408/93; 408/157
[58] Field of Search ............... 408/154, 157, 227, 238, 408/239 R, 239 A, 93, 147, 713; 29/26 A, 57

[56] References Cited

U.S. PATENT DOCUMENTS 4,140,432  2/1979  Heule .................................. 408/154
4,343,576  8/1982  Lagerholm et al. ............. 408/157 X

FOREIGN PATENT DOCUMENTS

793078  4/1958  United Kingdom ............... 408/147

Primary Examiner—Z. R. Bilinsky
Attorney, Agent, or Firm—Lilling and Greenspan

[57] ABSTRACT

The milling cutter with a feeding motion in forward and reverse mills plane surfaces of large diameter in the area of through holes and consists of a tool head which can be driven in rotation by a shank and in which are mounted two cutting parts so as to be radially movable and lockable in seating slots. The cutting parts are shifted by means of a rocker which is disposed so as to be rotatable about the longitudinal axis of the tool and whose steering bolts attached to its face and pointing in an axial direction engage associated recesses in the cutting parts in the manner of crank pins.

9 Claims, 25 Drawing Figures

FORWARD AND REVERSE MILLING CUTTER

FIELD OF THE INVENTION

The invention relates to a milling cutter with a feeding motion in both forward and reverse directions to machine large diameter plane surfaces in the area of through holes, with a cutter head which can be driven in rotation by a shank and has at least one cutting part pointing radially outward and having its greatest distance from the longitudinal center axis in one rotary direction of the tool.

BACKGROUND OF THE INVENTION

A milling cutter of the above mentioned kind has become known from a model of the Eri Company. The purpose of such a milling cutter is the machining of plane surfaces of large diameter at the front and the back of through holes.

The known milling cutter consists of a shank, at whose face is disposed a radial seating slot in which a cutting part pivotable in a radial direction is inserted. When the milling cutter is driven in rotation, the cutting part can be flipped out of the seating slot in one rotary direction so that it will mill the desired plane surface, while in the other rotary direction the cutting part flips back into the seating slot and can travel through the through hole without machining a milled surface.

It is assumed in the known tool that the recess in the tool body intended for the cutting part to flip into is always free of chips so as to assure that the cutting part will flip in at all. This makes the applicability of the tool to CNC machines questionable because the flipping in and out of the cutting part does not always succeed.

Furthermore, great precision cannot always be achieved because, on the one hand, the cutting part must be rotatably mounted and, on the other hand, it is subjected to great pressure when milling in reverse.

SUMMARY OF THE INVENTION

It is an object of the invention to further develop a milling cutter of the above mentioned kind so that it will function safely operationally and have a longer life at lower costs.

The problem posed is solved in that two cutting part are mounted so as to be radially movable and lockable in seating slots of the tool head, opposing each other and contacting each other in the area of the seating slot. The shifting motion of the cutting parts is accomplished by a rocker which is mounted so as to be rotatable about the longitudinal axis of the tool and whose steering bolts, attached to its face and pointing in an axial direction, engage coordinated recesses in the cutting parts.

The arrangement of two cutting parts pointing radially outward results in the significant advantage that the cutting parts support each other in their center area, thus absorbing the machining pressure relatively well. Another significant advantage is that the steering bolts which move the cutting parts in and out are themselves not affected by the machining pressure, remaining completely free of the machining pressure and, therefore, not being subject to wear. Rather, the cutting parts support each other in their center area on the one hand, while their outer area is in contact with strike surfaces of the seating slot in the tool body on the other hand.

The radial shifting of the cutting parts is accomplished by a cylindrical shaft, called a rocker, at one face of which the steering bolts are disposed, the rocker being rotatably mounted in the bore of a guide sleeve fixed to the housing and driven in rotary motion by the tool shank.

Accordingly, when the rocker turns due to the rotation of the shank, the steering bolts will perform a slider crank motion (eccentric), causing the cutting parts to be either moved radially out of the seating slot in the tool head, machining the desired milled surface at the front or back of the through hole, or, if the shank is driven in the other rotary direction, the steering bolts move the cutting part radially in so that the tool can travel through the through hole.

The shank is rotatably mounted in roller thrust bearings in the tool jacket fixed to the housing and can pivot in the jacket only within limits by a defined pivot angle.

The pivot angle of the shaft in the jacket is limited in that there is rigidly fastened to the jacket bore a twist stop designed as a circular segment whose faces have strike surfaces which a key disposed in a radial slot in the shank can be caused to contact. Consequently, upon the key striking one of the strike surfaces of the twist stop, the cutting parts are pushed radially out of their seating slot in the tool body and perform the milling operation, whereas upon the key striking the opposite strike surface of the twist stop, the cutting parts will disappear in the seating slot of the tool head, and the tool head can travel through the through hole.

In order to be able to perform milling operations of different diameters quickly it is preferable to detain the guide sleeve together with the rocker and the cutting parts in the tool body, so as to be readily exchangeable. This is accomplished by the guide sleeve being joined to the tool jacket by means of screws, and by the rocker being detachably joined to the shank in the manner of a plug-in coupling so that, while being able to be pulled out in and axial direction, it is coupled to the shank in a radial direction.

To mill different diameters, the guide sleeve is then simply unscrewed from the jacket and can be pulled off the tool together with the rocker, thereby disengaging the plug-in coupling between the rocker and the shank. Then another guide sleeve, such as one of larger diameter with different cutting parts, is installed and the rocker joined to the shank via the plug-in coupling, and the guide sleeve is screwed to the jacket so that, after this simple replacement, milling operations of larger diameters can now be performed.

Another embodiment of a milling cutter according to the present invention provides for the shank to be mounted in the milling cutter jacket in ball bearings (as in the embodiment described first), but that the shank has a radial shoulder of larger diameter, against which the ball bearings rest in front and back in longitudinal direction, making this arrangement capable of transmitting greater axial forces from the rotating shank to the milling tool jacket.

This embodiment is further characterized in that a twist brake (brake device) is provided to assure between the retraction and extension of the cutters a braked intermediate position so that, for instance, when retracting the cutters, they will not bounce back from their retracted position and unintentionally project out of the tool head, which would lead to an incorrect machining operation.

Conversely, the twist brake ensures that, when the cutters are in their fully extended position in the tool head, they are not unintentionally retracted into the cutter head again due to the shank twisting too quickly with respect to the milling tool jacket, thereby initiating an incorrect milling operation. The spring-back of the shank with respect to the milling cutter jacket is effected by a key connected to the shank striking coordinated strike surfaces of a segment shaped twist stop which is connected to a milling cutter jacket. When reversing the direction of rotation of the shank, i.e. between retraction and extension of the cutters (i.e. between the key contacting the one or the other strike surface of the twist stop), the twist brake interposes a braked intermediate position so that the cutters are prevented from impacting too severly and abruptly and, associated therewith, from being unintentionally shifted in the cutter head of the milling cutter.

Other features of the invention are the subject of the dependent claims.

The subject of the present invention follows not only from the subject of the individual patent claims, but also from the combination of various patent claims.

All data and features disclosed in the documents, in particular the physical designs illustrated in the drawing are claimed as being essential to the invention to the extent they are novel, singly or in combination, versus the state of the art.

The invention is explained below in greater detail by reference to drawings showing but one embodiment. Further features and advantages of the invention are evident from the drawings and their description.

DETAILED DESCRIPTION OF THE INVENTION

Figure 1:
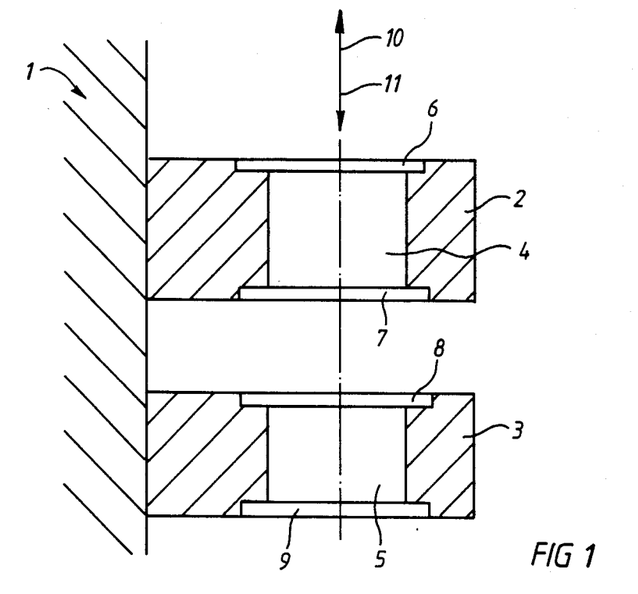
FIG. 1 is a side view of a workpiece with several tandem through holes.

An application example for a milling cutter illustrated in FIG. 1 is when two parts 2, 3 are disposed separate from each other on a workpiece 1. Each part 2, 3 has a through hole 4, 5. Now, it is the job of the tool according to the invention to mill the surfaces 6, 7, 8, and 9 in the form of plane surfaces in simple manner going forward and backwards whereby it should be possible to provide these milled surfaces in randomly selectable diameters. In addition to milling plane surfaces, concave or convex shapes or bevels of any angle or any other form can also be machined.

Figure 2:
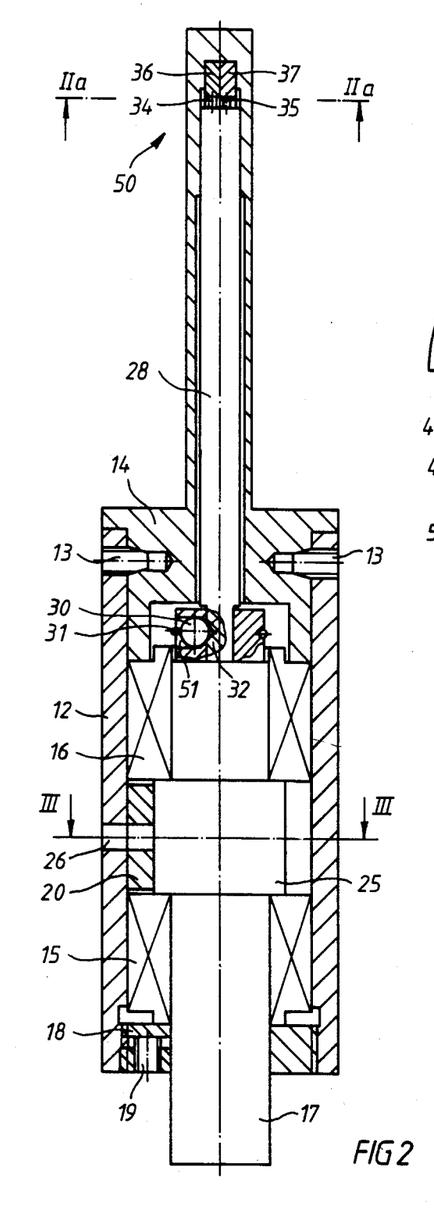
FIG. 2 is a longitudinal-sectional view of the cutter tool.
Figure 3:
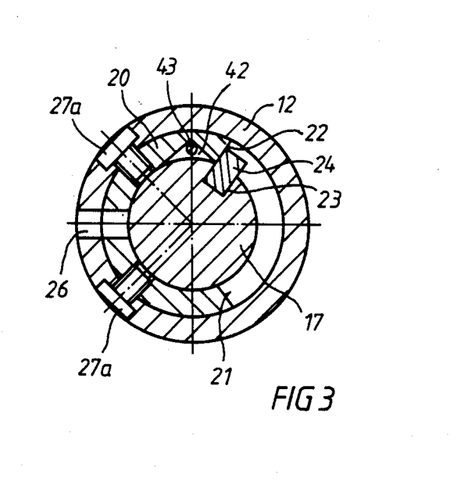
FIG. 3 is a cross-sectional view taken along lines III—III in FIG. 2.
Figure 4:
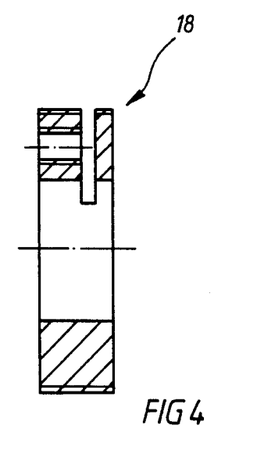
FIG. 4 is a cross-sectional view of the threaded adjusting ring of the tool.
Figure 5:
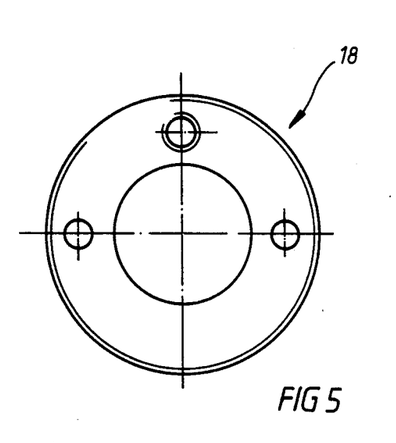
FIG. 5 is a top view of the threaded adjusting ring.

The milling cutter according to FIGS. 2 and 3 consists of a jacket 12 fixed to the housing, the jacket beings crewed to a guide sleeve 14 by fastening screws 13 whose lower end has a 30° taper. Disposed on the inside of the jacket 12 are two mutually spaced roller thrust bearings 15, 16 which accommodate a rotatable shank 17. At the rear end of the jacket 12 is a threaded adjusting ring 18 which, in conjunction with the set screw 19, permits the axial adjustment of the roller thrust bearings 15, 16 relative to the shank free of play.

The shank 17 has a centered section 25 of larger diameter to serve as an axial stop for the roller thrust bearing 15, 16. The face of the roller thrust bearing 16 near the tool head is in contact with the inner face of the guide sleeve 14.

In the area of the larger diameter section 25, a twist stop 20 is fixed to the inside of the jacket, fastening screws 27a being provided in appropriate holes in the jacket to engage with their bolt end coordinated fastening holes 27 of the twist stop 20.

Also provided in the twist stop 20 is an exactly located hole 26 which is aligned with a similar hole in the area of the jacket 12. A locating pin not detailed is inserted in both holes so that the angular position of the twist stop 20 relative to the jacket is fixed precisely. It is important for the angle between the stop surfaces 21, 22 of the twist stop 20 designed as circular segment to be exactly 110°, which corresponds to the pivot angle of the shank 17, with the cutting parts being movable radially from the retracted position into the extended position and back.

Figure 8:
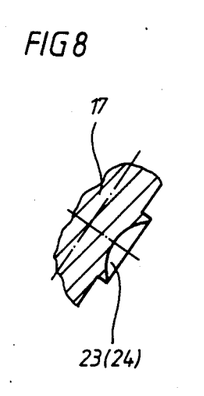
FIG. 8 is a cross-sectional view taken along lines VIII—VIII in FIG. 7.

To limit the pivot angle between the shank 17 and the twist stop 20 there is machined into the shank 17 a radial slot 22 in which a key 24 is inserted. The key projects beyond the outer diameter of the shank 17 in a radial direction so that it, together with the stop surfaces 21, 22 of the twist stop 20, forms the pivot angle limitation for the rotary drive of the shaft 17. For easy insertion into the slot, the root surface of the slot is semicircular (FIG. 8).

Figure 6:
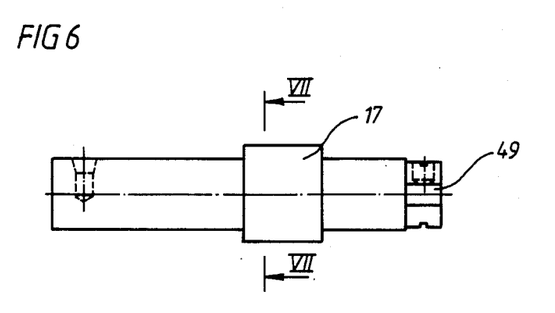
FIG. 6 is a side view of the shank.
Figure 7:
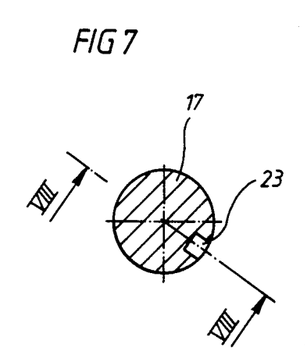
FIG. 7 is a cross-sectional view taken along lines VII—VII of FIG. 6.
Figure 9:
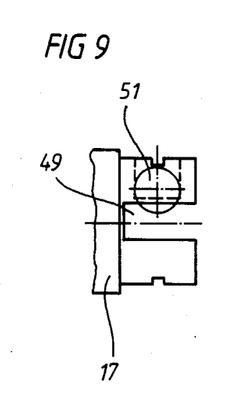
FIG. 9 is a side view of the shank end near the tool head.
Figure 10:
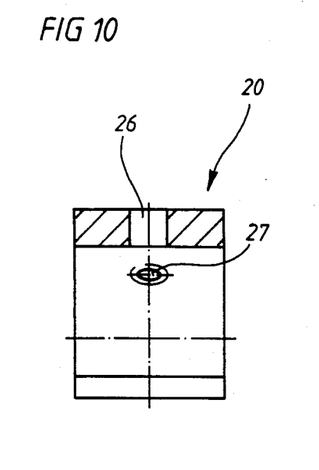
FIG. 10 is a cross-sectional view of a twist stop.
Figure 14:
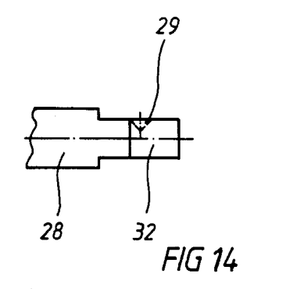
FIG. 14 is a side view of the rocker end near the tool head.
Figure 15:
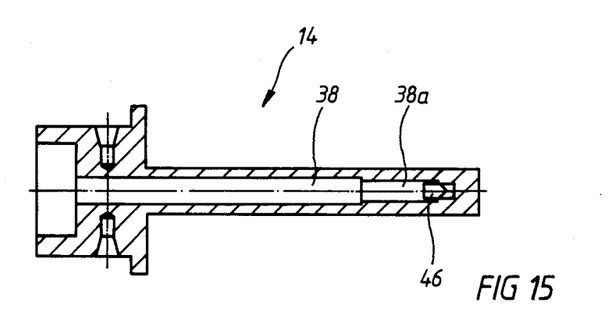
FIG. 15 is a cross-sectional view of the guide sleeve.
Figure 16:
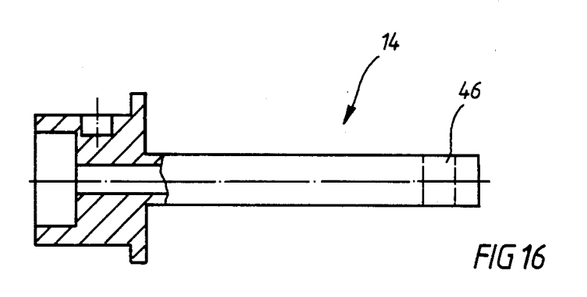
FIG. 16 is a side view, partially in section, of the guide sleeve.

The face of the shank 17 near the tool head has a slotshaped recess 49 according to FIGS. 6 and 9 which is engaged by the fastening tabs 32 on the rear face of a shaft called rocker 28. The rocker 28 is mounted in the recess 49 in the manner of a plug-in coupling. According to FIGS. 2 and 9 this is accomplished by providing a mounting hole 51 for the insertion of a detent ball 30, the mounting hole 51 intersecting the recess 49. The OD of the detent ball is gripped by a spring ring 31 which pushes the detent ball underspring force into the area of the recess 49. Provided in the area of the fastening tab 32 of the rocker 28 is a locating hole 29 (FIG. 14) which the detent ball 30 engages.

A detachable plug connection (plug-in coupling) is created in this manner between the rocker 28 and the face of shank 17. The rocker 28 is thus connected to the shank 17 so as to corotate with it, but it can be pulled off in an axial direction. The rocker 28 consists of a shaft rotatably mounted in the longitudinal center bore 38 of the guide sleeve, the bore 38 being of larger diameter than the adjacent longitudinal center bore 38a so that the rocker 28 is rotatably mounted only in the area of the longitudinal center bore 38a of the guide sleeve 14.

Two mutually spaced steering bolts 34, 35 opposite each other are provided at the face of the rocker 28 near the tool head.

Figure 2A:
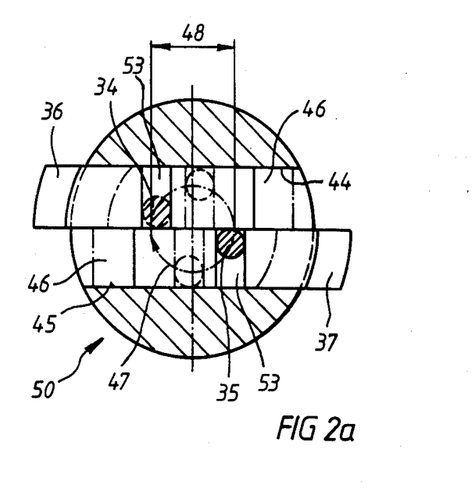
FIG. 2a is a cross-sectional view taken along lines IIa—IIa in FIG. 2.

According to FIG. 2a, the steeing bolts engage slot-shaped recesses 53 in the cutting parts 36, 37. The cutting parts 36, 37 oppose each other in a radial seating slot in the tool head 50. In their inner area the cutting parts 36, 37 contact each other, whereas they contact in their outer area associated stop surfaces 44, 45 of the tool head 50 in the area of the seating slot 46. This makes for optimal power transmission of the machining pressure. The machining pressure is absorbed by the inner stop surfaces 44, 45 of the guide sleeve 14 and is transmitted to the jacket 12 via the guide sleeve 14, and to the twist stop 20 via the locating pin inside the hole 26, and to the shank 17 via the key 24. This arrangement avoids the absorption of the machining pressure by the steering bolts 34, 35, which would thereby be subjected to much wear.

The machining forces are thus not transmitted to the steering bolts 34, 35, which therefore assume only the job of radially shifting the cutting parts 36, 37. In other words, the steering bolts 34, 35 engage the slotshaped recesses 53 of the cutting parts 36, 37 in the manner of crank pins.

If the rocker 28 is turned by turning the shank 17, the steering bolts 34, 35 will move along a circular arc 47, thereby moving from an their initial position illustrated in FIG. 2 by borken lines into a second position shown in unbroken lines. This moves the cutting parts 36, 37 a distance 48.

Figure 11:
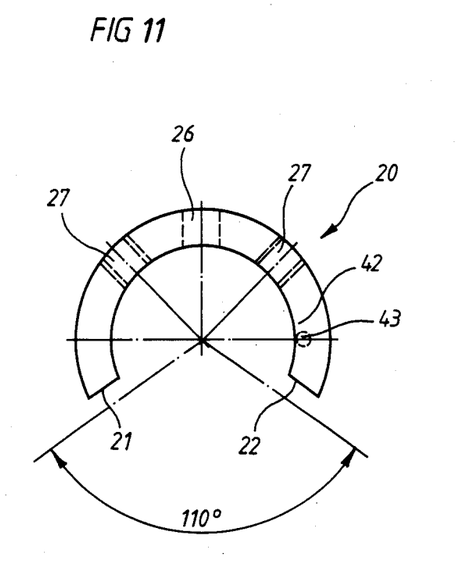
FIG. 11 is a side view of the twist stop.
Figure 12:
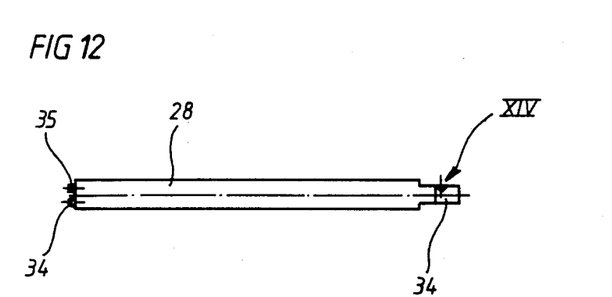
FIG. 12 is a side view of a rocker.
Figure 13:
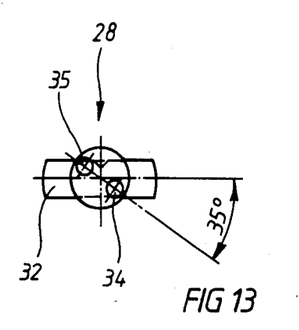
FIG. 13 is a front view of the rocker end near the tool head.

Also significant in FIG. 3 is that the key 24 is offset by a 35° angle relative to a line going through the steering bolts 34, 35 (see FIG. 13). As it relates to the 110° angle on the twist stop as illustrated in FIG. 11 and FIG. 3, this results in the required shifting motion.

It is desirable in some applications for the twisting of the shank 17 to be arrestable so that the striking action of the key 24 against the stop surfaces 21, 22 of the twist stop 20 will not lead to the shank 17 bouncing back, which could be the case particularly when rapid rotary speeds are involved.

In this regard, the shank 17 is designed so it can be locked to the jacket 12 as illustrated in FIG. 3. This is accomplished by machining a conical locking recess 42 in which a locking roll 43 lies in the inner diameter in the area of the twist stop 20. The locking roll 43 then jams in the V of the locking recess 42 in the direction of the outer diameter of the shank 17 when the key 24 strikes the stop surface 22. Analogously, the same locking action takes place at the opposite stop surface 21 when the key 24 strikes it.

In another embodiment, not shown in the drawings, instead of the clamping action between the shank 17 and the jacket 12 in the end positions There is a corresponding locking action between the shank 17 and the twist stop 20.

Such locking may either be spring-loaded or magentic. In the last mentioned embodiment example an appropriate magnetic contact between two permanent magnets of opposite polarity is established in the area of the stop surfaces 21, 22 when the key 24 strikes there, one of the permanent magnets corotating with the shank 17 and the other with the twist stop 20 or the jacket 12.

Accordingly, it is possible in simple manner with the milling cutter described to machine the respective milled surfaces 6, 7, 8, and 9 in the area of the through holes 4, 5 in forward milling (arrow direction 11 in FIG. 1) or in reverse milling (arrow direction 10 in FIG. 1).

Figure 17:
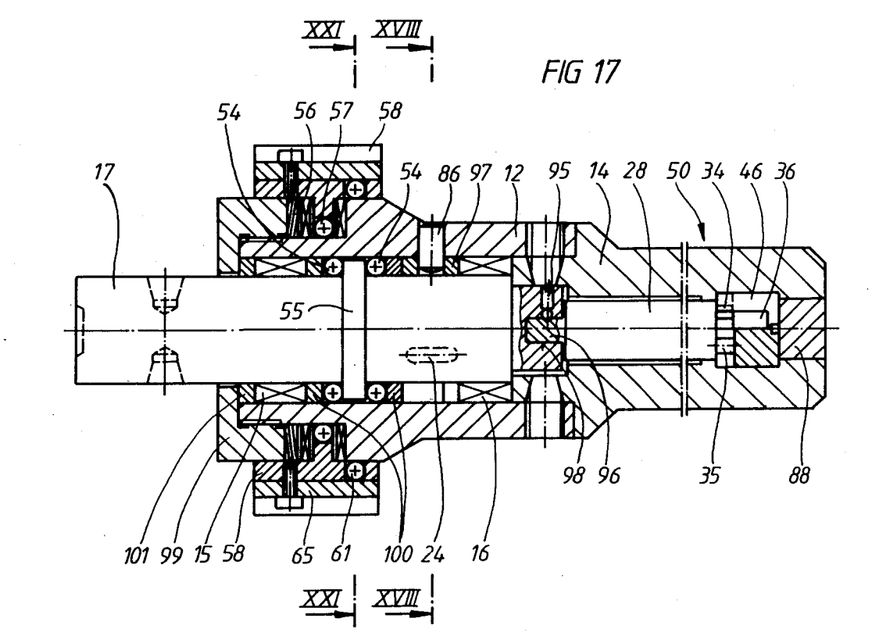
FIG. 17 is a longitudinal cross-sectional view of a second embodiment of the inventive tool.

In the second embodiment of a milling center according to the invention as shown in FIG. 17, identical parts have the same reference symbols as in the previous drawings. The shank 17 of the milling cutter is rotatably mounted in the jacket 12 in that additional ball bearings 54 to absorb essentially axial forces are present besides the roller thrust bearing 15, 16 which essentially absorb radial forces and were already present in FIG. 2. The axial forces of shank 17 are transmitted to the jacket 12 in that there is formed to the shank 17 as an integral part a ring flange 55 of larger diameter which is contacted by the ball bearings 54 in front and rear, as viewed in a longitudinal direction.

The ball bearing 54 are framed front and rear by appropriate washers 100. The rocker 28 is joined to the face of shank 17 via a plug-in coupling - similar to the embodiment example shown in FIG. 2. The face of shank 17 has a seating hole 98, engaged by the pin 96 on the face of the rocker 28. The pin 96 is arrested in the seating hole 98 of shank 17 by means of a detent ball pushed by a set screw 95 into a V-shaped recess in the pin 96 of rocker 28.

As in the embodiment illustrated in FIG. 2 and described above, the rocker 28 is rotatably mounted in the guide sleeve 14 of the tool head 50, the steering bolts 34, 35 of the rocker 28 again engaging associated recesses of the cutters 36, 37, as was described in connection with FIG. 2a.

The face of the tool head 50 is formed by a detachable covering plug 88.

The axial play of the ball bearings 57 is adjusted by a terminal washer 101 which rests against the inner diameter of a threaded adjusting ring 99. The latter can be turned with respect to the jacket 12, there being provided inside a Belleville washer 56 which adjusts the axial play of the ball bearing 57 and of the entire brake hoop 58 mounted over it.

Consequently, the brake hoop can rotate with respect to the jacket 12 due to the axially adjustable ball bearing 57.

In the following is described the twist brake which is coordinated with the brake hoop 58 and which sees to it that, when the shank 17 changes its direction of rotation with respect to the jacket 12, the cutters 36, 37 wlil not move unintentionally from their set position due to the key 24 hitting the associated stop surfaces of a twist stop 97 (see FIG. 18).

Figure 18:
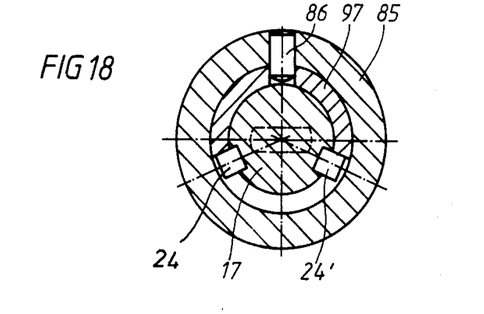
FIG. 18 is a cross-sectional view taken along lines XVIII—XVIII in FIG. 17.
Figure 19:
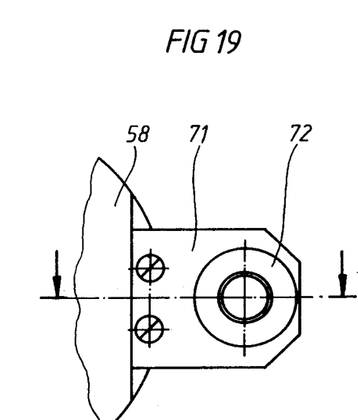
FIG. 19 is a partial side view of a positioning yoke.

According to FIG. 18, the shank 17 is associated with a key 24 which projects radially beyond the outer diameter of the shank 17 and with which are associated stop surfaces of a segment-shaped twist stop 97 which, in turn, is rigidly connected to the jacet 12 by a dowel screw 86.

As a variant there is shown in FIG. 18 a second key 24'. However, only either key 24 or key 24' is present always. In the presence of key 24, the cutters 36, 37 are retracted in the tool head 50 in the position shown, whereas in the presence of key 24' the cutters 36, 37 are extended out of the tool head 50 in the position shown.

The twist brake, described in the following by way of FIGS. 21 through 23, prevents that when the key 24 hits the associated stop surfaces of the twist stop 97 abruptly, the cutters are moved unintentionally out of their position once set.

Figure 21:
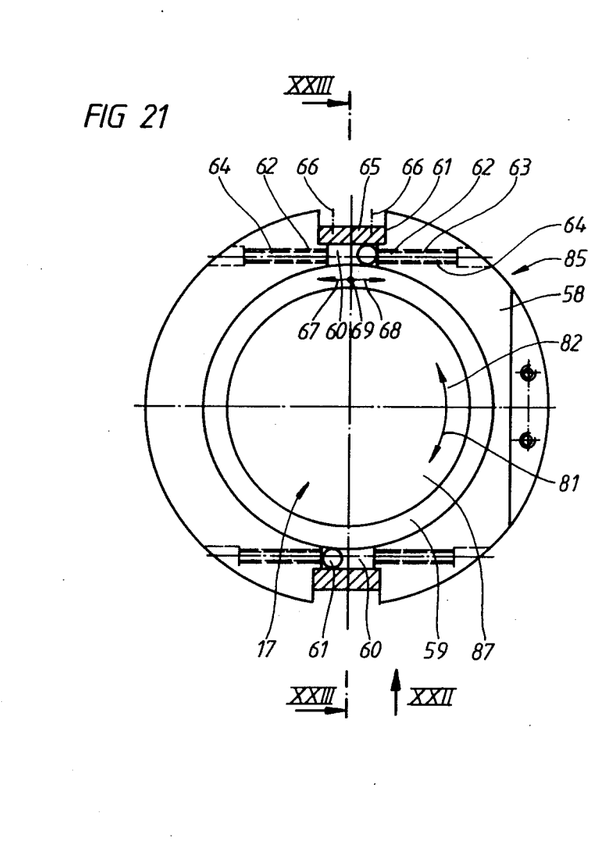
FIG. 21 is a cross-sectional view taken along lines XXI—XXI in FIG. 17.
Figure 22:
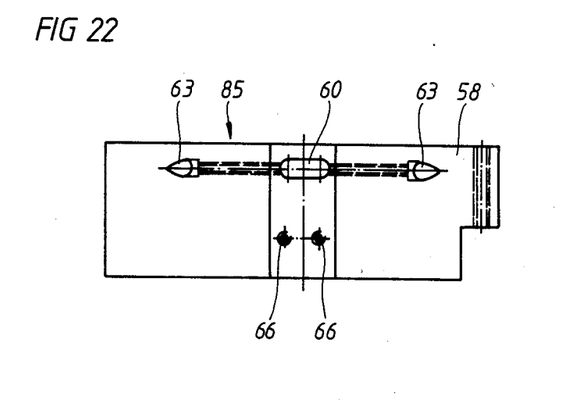
FIG. 22 is a top view of the brake hoop in the direction of arrow XXII in FIG. 21.
Figure 23:
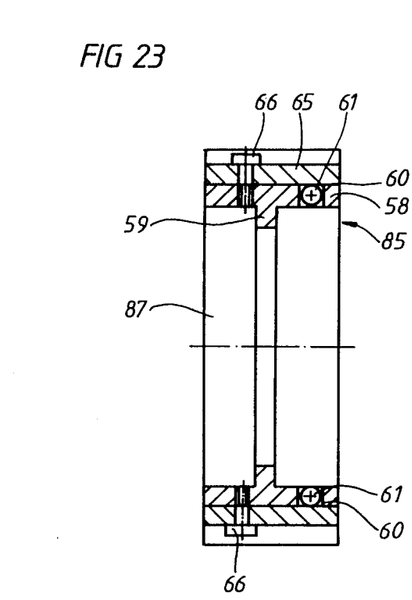
FIG. 23 is a cross-sectional view taken along lines XIII—XIII in FIG. 21.

The twist brake is formed here by the brake hoop 58 which, according to FIGS. 21 through 23, consists of a hollow-cylindrical part with a center bore 87. The brake hoop has a smaller diameter ring flange directed radially inward, by means of which it rests on the associated ball bearing 57, where it is rotatably mounted.

In the area outside of the ring flange 59, there are provided in the inner diameter of the brake hoop 58 two mutually opposite holes 60 which, according to FIG. 21, extend tangential to the circumference of the center bore 87, partly intersecting the bore 87. Each brake ball 61 each is provide in each hole 60, in which the ball 61 can move axially. Each face of the hole 60 is formed by a spring pin 62, each spring pin 62 disposed in the axial extension of the hole 60 in a hole 63 in the brake hoop 58 in alignment with it. Disposed in the mutually opposite holes 63 are springs 64 which preload the spring pins 62 with spring force so that they protrude slightly into the hole 60 from its faces.

In the one or the other of the other end position, the respective brake ball 61 makes contact with the face of the coordinated spring pin 62.

Towards the outer diameter of the brake hoop the holes are closed off by screws not detailed.

Each side of the hole 60 directed radially outward is formed by a solid brake disc 65 joined to the brake hoop 58 by two screws 66 (see FIG. 23). This brake disc 65, too, is tangential to the inner diameter of the center bore 87 and parallel to the longitudinal axis of the respective hole 63.

By turning the jacket 12 located inside the center bore 87 with respect to the brake hoop 58, the respective brake ball 61 is moved either into the one end position in arrow direction 67 or into the other end position in arrow direction 68 in the hole 60. The position 69 is the brake position. The upper brake ball 61 is moved in arrow direction 67 whenever the jacket 12 is turned in arrow direction 82 with respect to the brake hoop, whereas conversely the brake ball 61 is moved in arrow direction 68 when the jacket 12 is turned in arrow direction 81 with respect to the brake hoop 58.

During the transition of the brake ball 61 from arrow direction 68 to arrow direction 67 is arrives under the brake disc 65 in position 69 and presses there with great friction force against the jacket 12 of the milling cutter located in the center bore 87 because the tangential hole 60 partly intersects the inner diameter of the bore 87. Therefore, the top of the brake ball 61 is in frictional contact with the brake disc 65 and its bottom is in frictional contact with the jacket 12. This causes the rotation of the jacket 12 to be braked briefly during the transition from arrow direction 68 to arrow direction 67.

The ball shown at the bottom of FIG. 21 has the same function as the brake ball 61 shown at the top of that only the upper brake ball 61 was described for the sake of simplicity.

Accordingly, the effect of the twist brake 85 created by the brake hoop 58 is that upon each change in the direction of rotation of the shank 17 with respect to the jacket 12, the respective brake ball 61 must pass under the brake disc 65 to reach its other end position. The shank 17 thereby receives a short braking jolt and then immediately continues running in the other direction of rotation.

The purpose of the braking jolt is to prevent springback of the cutters 36, 37 when the rocker 28 is turned by the shank 17. To each cutter 36, 37 is always allotted the one or the other end position only without the existence of impermissible intermediate positions inbetween.

Figure 24:
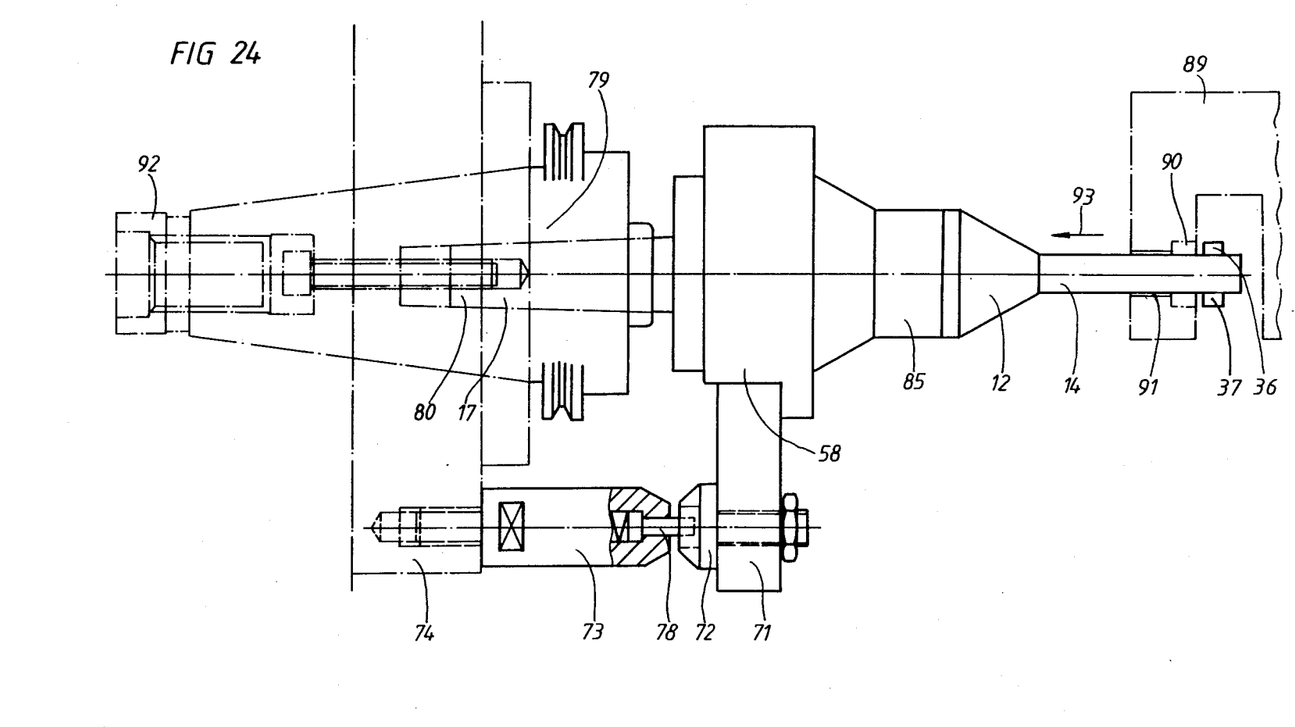
FIG. 24 is a side view illustrating either embodiment of the milling cutter in its final mounted position in the chucking cone of a driving machine with a locked positioning device.

The positioning device 73 coordinated with the brake hoop 58 is described below, which sees to it that the brake 58 is in corotating engagement with the machine tool 92 (FIG. 24). The brake hoop 58 is connected to a positioning yoke 71 located radially outward. It is the purpose of the positioning device 73 to bring the shank 17 and its chucking taper 80 of the milling cutter into a certain rotary position with respect to the chuck 79 of the machine tool 92 when operating the chuck of the machine tool 92 axially.

Figure 20:
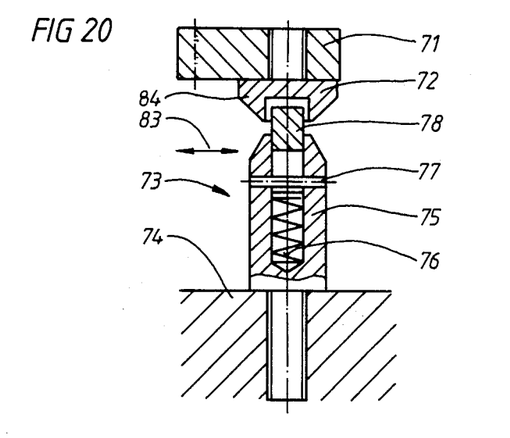
FIG. 20 is a cross-sectional view of a positioning device.

According to the invention, this is accomplished by means of a springloaded bolt 78 which is mounted so as to be axially movable into a locating seating bushing 75, countering the force of a spring 76, the bolt 78 being prevented from falling out by a dowel pin 77 penetrating a hole through the bolt 78.

The locating seating bushing 75 is connected to a threaded bolt which is screwed by a matching thread to a part 74 of the machine housing.

The spring-loaded bolt 78 snaps into a locating bushing 72 which is joined rigidly by a threaded pin to the positioning yoke 71 according to FIG. 20.

To make it easier for the bolt 78 to snap into the locating bushing 72 in the arrow directions 83, the bushing 72 has a bevel 84 in the outer diameter area of the coordinated seating hole.

Conversely, the locating bushing 72 may be fastened to the machine housing part 74, whereas the positioning device 73 may be fastened to the positioning yoke 71.

The shank 71 of the tool shown in FIG. 17 is chucked in the chuck 80. It is assumed that the bolt 78 of the positioning device 73 has not yet snapped into the locating bushing 72 on the positioning yoke 71. When the machine tool 92 is started, the positioning device 73 turns idly by a certain angular distance until the bolt 78 arrives opposite the locating bushing 72 and snaps into it.

The brake hoop 58 is then firmly connected to the machine housing part 74 while only the shank 17 is still being driven in the one or other direction of rotation to retract or extend the cutters and while the entire jacket 12 revolves with the cutters retracted or extended to perform the milling opeations shown in FIG. 1.

Shown in FIG. 24 as further example is an operation where the guide sleeve 14 has passed through a through hole 91 with the cutters 36, 37 retracted, the through hole 91 being adjoined by a larger diameter recess 90 in the workpiece 89. By appropriately turning the shank 17 by the machine tool 92, the cutters 36, 37 are now being extended and the entire jacket 12 is driven in rotation so that the recess 90 in the workpiece 89 is being milled when the rotating milling cutter moves backwards in arrow direction 93.

I claim:

1. A milling cutter having a bidirectional feeding motion used to machine a large diameter plane surface in an area around through holes, comprising:
   (a) a housing;
   (b) a jacket located within said housing;
   (c) a shank mounted in said jacket;
   (d) a cutter head rotatably driven by said shank and having at least one cutting part pointing radially outward from said milling cutter, said cutting part being at a farthest radial distance from a longitudinal center axis of said milling cutter in one direction of rotation of said cutter head and being at a closest radial distance from said longitudinal center axis of said milling cutter in another direction of rotation of said milling cutter;
   (e) a rocker having one end adjacent to said shank of said milling cutter, said rocker rotating about said longitudinal axis of said milling cutter to shaft said cutting part from one position to another position;
   (f) a tool head adjacent to a second end of said rocker having a seating slot used to mount said cutting part in a radially movable and lockable position;
   (g) at least one steering bolt attached to a second end of said rocker and pointing in an axial direction, said steering bolt engaging at least one coordinated recess in said cutting part; and
   (h) a twist break disposed between said shank and said jacket to hold a twist position of said shank until said shank reverses direction of its rotation.

2. A milling cutter according to claim 1, wherein said rocker comprises a cylindrical shaft having one end attached to said steering bolt, said rocker rotatably mounted in a bore of a guide sleeve fixed to said housing of said milling cutter.

3. A milling cutter according to claim 2, wherein said cylindrical shaft of said rocker further comprises a second end having a plug-in coupling inserted in an end of said shank near said cutter head to axially detach and rotatably drive said rocker.

4. A milling cutter according to claim 3, wherein said shank comprises a second end rotatably mounted in roller thrust bearings in said jacket of said milling cutter to limit rotation of said shank in said jacket by a determined pivot angle.

5. A milling cutter according to claim 4, wherein said shank further comprises a key inserted in radial slot to strike against at least one stop surface of a twist stop, said twist stop having an arcuate design and fastened in a bore of said jacket to corotate with said shank.

6. A milling cutter according to claim 1, wherein said twist brake comprises a brake hoop having a center bore rotatably mounted in said roller thrust bearings on said jacket, said brake hoop having at least two mutually opposed holes disposed in an inner diameter of said center bore having a longitudinal direction aligned tangentially to an outer diameter of said shank, said holes partially intersecting said outer diameter of said shank; a brake disc covering one of said holes from a radially outward position by partially intersecting said hole and partially projecting into an inner diameter of said hole; and a brake ball axially and movably inserted into an inner diameter of said shank.

7. A milling cutter according to claim 6, wherein said brake hoop is further connected to a positioning yoke cantilevered radially from said milling cutter and having a component mounted inside said housing.

8. A milling cutter according to claim 1, wherein said cutting part further comprises two cutting elements positioned adjacent to each other and in contact in an area of said seating slot, said cutting elements are shifted by said rocker.

9. A milling cutter having a bidirectional feeding motion used to machine a large diameter plane surface in an area around through holes comprising:
   (a) a housing;
   (b) a jacket located within said housing;
   (c) a shank mounted inside said jacket;
   (d) a cutter head rotatably driven by said shank and having at least one cutting part pointing radially outward from said milling cutter, said cutting part being at a farthest radial distance from a longitudinal center axis of said milling cutter in one direction of rotation of said cutter head and being at a closet radial distance from said longitudinal center axis of said milling cutter in another direction of rotation of said milling cutter;
   (e) a rocker made of a cylindrical shaft having one end adjacent to said shank of said milling cutter and a second end having a plug-in coupling inserted into an end of said shank near said cutter head to axially detach and rotatably drive said rocker, said rocker mounted in a bore of a guide sleeve fixed to said housing to rotate about said longitudinal axis of said milling cutter to shift said cutting part from one position to another;
   (f) a tool head adjacent to said second end of said rocker having a seating slot to mount said cutting part in a radially movable and lockable position;
   (g) at least one steering bolt attached to a second end of said rocker and pointing in an axially direction, said steering bolt engaging at least one coordinated recess in said cutting part;
   (h) a twist brake disposed between said shank and said jacket to hold a twist position of said rotation of said shank in a position until said shank reverses directions of its rotation, said twist brake having a brake hoop connected to a positioning yoke cantilevered radially from said milling cutter with a component of said positioning yoke mounted inside said housing, said brake hoop having a center bore rotatably mounted in roller thrust bearings on said jacket and two mutually opposed holes disposed in an inner diameter of said center bore having a longitudinal direction and aligned tangentially to an outer diameter of said shaft, said mutually opposed holes partially intersecting an outer diameter of said shank;
   (i) a brake disc covering one of said mutually opposed holes from a radially outward position by partially intersecting said hole and partially projecting into an inner diameter of said hole; and
   (j) a brake wall axially and moveably inserted in to an inner diameter of said shank.

* * * * *